United States Patent [19]
Ebner

[11] Patent Number: 6,125,646
[45] Date of Patent: Oct. 3, 2000

[54] HEATING OR COOLING ARRANGEMENT IN A MOTOR VEHICLE

[75] Inventor: Andreas Ebner, Stuttgart, Germany

[73] Assignee: Micro Compact Car AG, Biel, Switzerland

[21] Appl. No.: 09/236,828

[22] Filed: Jan. 25, 1999

[30] Foreign Application Priority Data

Jan. 23, 1998 [DE] Germany .......................... 198 02 492

[51] Int. Cl.⁷ .................................................. F25D 19/00
[52] U.S. Cl. ................................ 62/298; 62/239; 165/67; 165/178; 165/DIG. 906
[58] Field of Search ....................... 62/298, 239; 165/67, 165/178, DIG. 906

[56] References Cited

U.S. PATENT DOCUMENTS

| | | | |
|---|---|---|---|
| 3,966,156 | 6/1976 | Frischmann et al. ...................... | 165/67 |
| 5,240,068 | 8/1993 | Tokutake ................................... | 165/67 |
| 5,407,161 | 4/1995 | Mulkeran .................................. | 165/67 |
| 5,509,473 | 4/1996 | Tokutake .................................. | 165/178 |
| 5,632,332 | 5/1997 | Hanafusa .................................. | 165/178 |
| 5,755,189 | 5/1998 | Godeau et al. ......................... | 123/41.01 |
| 5,975,245 | 11/1999 | Jephott et al. ......................... | 184/104.3 |

FOREIGN PATENT DOCUMENTS

| | | |
|---|---|---|
| 39 16 816 | 5/1990 | Germany . |
| 58-75008 | 5/1983 | Japan . |

*Primary Examiner*—William Doerrler
*Assistant Examiner*—Mark Shulman
*Attorney, Agent, or Firm*—Evenson, McKeown, Edwards & Lenahan, P.L.L.C.

[57] ABSTRACT

A heating or cooling arrangement in a motor vehicle is provided with an equipment block, in which a heat exchanger, an evaporator, a condenser or a cooler are arranged on the inlet and outlet pipes. The heat exchanger, evaporator, condenser or cooler is slid into the equipment block as a preassembled heating or cooling unit. The equipment block is provided with clamping elements by which inlet and outlet pipes arranged on the heat exchanger, the evaporator, the condenser or the cooler in a preassembled manner are connected with the equipment block.

18 Claims, 1 Drawing Sheet

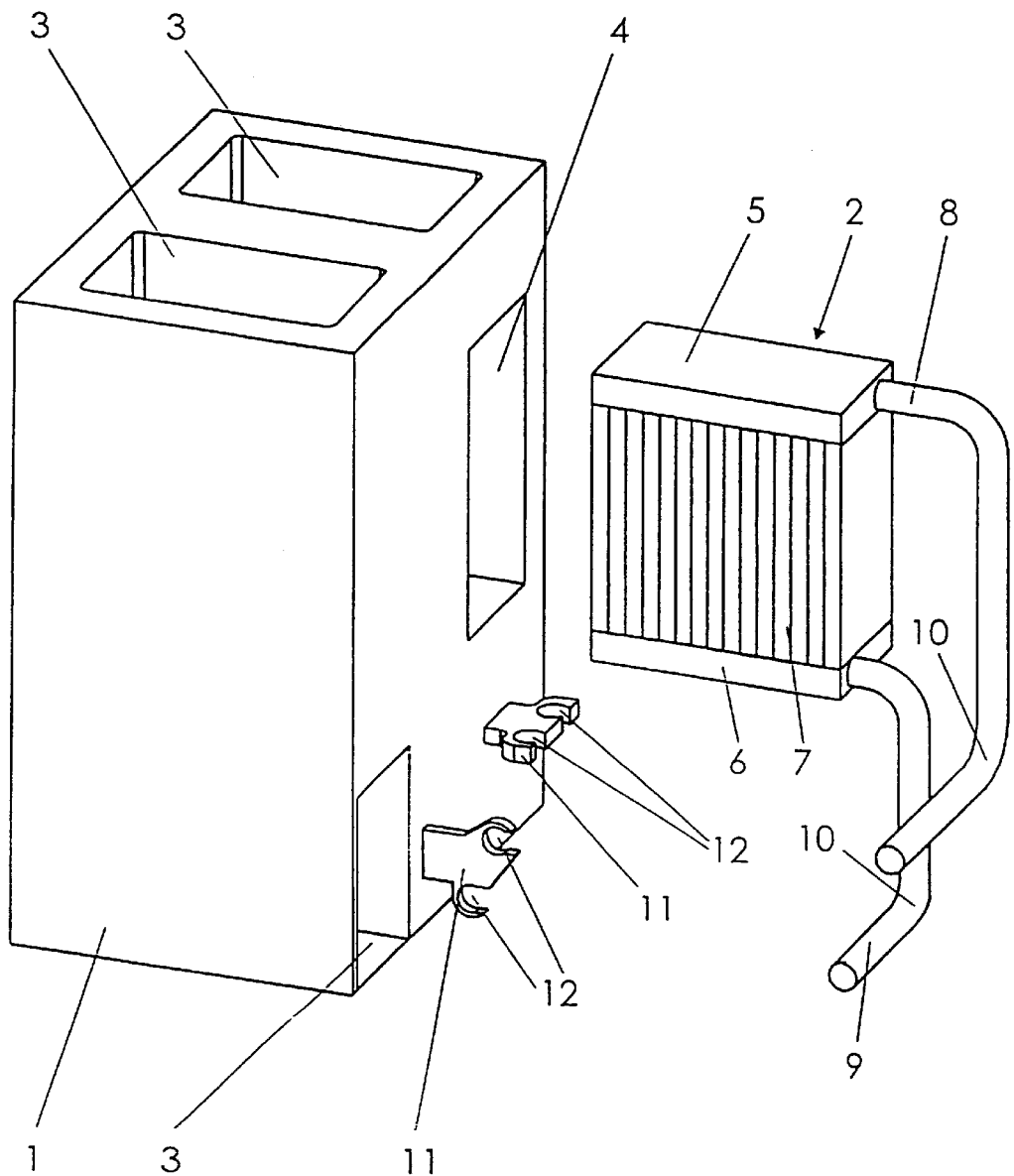

HEATING OR COOLING ARRANGEMENT IN A MOTOR VEHICLE

BACKGROUND AND SUMMARY OF THE INVENTION

This application claims the priority of German Application No. 198 02 492.4, filed Jan. 23, 1998, the disclosure of which is expressly incorporated by reference herein.

The invention relates to a heating or cooling arrangement in a motor vehicle having an equipment block into which a heat exchanger, an evaporator, a condenser or a cooler is inserted, on which inlet and outlet pipes are arranged. The heat exchanger, the evaporator, the condenser or the cooler is slid into the equipment block as a preassembled heating or cooling unit. Such a known arrangement is described, for example, in German Patent Document DE 39 16 816 C2.

Normally, pipe parts are mounted to the corresponding inlets or outlets of the heating or cooling components only after the heating or cooling unit has been built into the equipment block. Subsequently, the pipe parts are connected or fixed by means of screwing to the exterior side of the equipment block or to other parts. For building into the equipment block either a heat exchanger, an evaporator, a condenser or a cooler, it is a disadvantage of the prior art that different joining steps and mounting operations are required. In this case, the unit to be built-in must be rotated until the inlet and outlet connections mounted on the unit are in the correct position for the pipe parts to be mounted. In addition, the tools must be frequently changed and different fastening materials are required for the mounting. After correctly sliding the corresponding unit into the equipment block, the corresponding pipe parts must then be mounted to the connections of the unit provided for this purpose. The complete mounting of the corresponding unit, including the pipe parts, thus takes a long time and has a high cost. Furthermore, the corresponding tools must be available for each working step. The corresponding tools must also be available during the removal of the heat exchanger, evaporator, condenser or cooler for repair or servicing purposes.

The initially cited German Patent Document DE 39 16 816 C2 shows a system for heating a motor vehicle with an equipment block, into which a heat exchanger is inserted which has inlet and outlet pipes. The heat exchanger is slid into the equipment block as a preassembled heating unit and is fixed in it through the use of locking clips. However, the reference does not mention how the inlet and outlet pipes can be held.

It is therefore an object of the present invention to provide a heating or cooling arrangement in a motor vehicle, in which, by using a single joining operation, the unit provided for the equipment block can be built-in or removed again at reasonable cost and in a time-saving manner, without the requirement of additional mounting steps, fastening devices or special tools.

According to the invention, this object is achieved by a heating or cooling arrangement in a motor vehicle having an equipment block into which a heat exchanger, an evaporator, a condenser or a cooler is inserted, on which inlet and outlet pipes are arranged. The heat exchanger, the evaporator, the condenser or the cooler is slid into the equipment block as a preassembled heating or cooling unit. The equipment block is provided with clamping elements by which the inlet and outlet pipes, arranged in a preassembled manner on the heat exchanger, the evaporator, the condenser or the cooler, are connected with the equipment block.

As a result of the fact that the heat exchanger, the evaporator, the condenser or the cooler is pushed-into the equipment block with the preassembled inlet and outlet pipes, the previously required later mounting of the pipe parts to the corresponding unit is avoided. The pipe parts premounted on the heat exchanger, the evaporator, the condenser or the cooler are connected in one working step during the sliding-in of the corresponding unit by using the clamping elements mounted on the equipment block. As the result of the connection of the pipe parts with the clamping elements, the premounted heating or cooling unit is automatically built in the correct position into the equipment block. A faulty building-in is therefore excluded because the precise position of the premounted heating or cooling unit is determined by the mounting opening in the equipment block and the clamping elements. The previously required rotating and displacing is therefore eliminated.

The previously required accommodation of tools in order to screw the pipe parts to the equipment block is eliminated because of the clamping elements already mounted on the equipment block. The previously required storage of corresponding screws and similar material is therefore are superfluous. Because the clamping elements are already connected with the equipment block, a faulty or inaccurate mounting of the pipe parts is prevented.

For mounting the heating or cooling arrangement in a motor vehicle, the use of special tools is no longer required because the sliding of the corresponding premounted unit into the equipment block can be carried out without the use of tools. The connection of the pipe parts with the clamping elements also does not require the aid of a tool. This results in savings of cost and time. Also, during a later demounting for servicing purposes, the corresponding heating and cooling unit can be removed from the equipment block without the use of tools. For this purpose, the pipe parts are detached from the clamping elements and the heating and cooling unit is therefore released from equipment block.

Other objects, advantages and novel features of the present invention will become apparent from the following detailed description of the invention when considered in conjunction with the accompanying drawings.

BRIEF DESCRIPTION OF THE DRAWING

The single FIGURE of the drawing is a simplified view of a fan device for heating or cooling in a motor vehicle with an equipment block having fastening clips and a heat exchanger with pipe parts arranged on it.

DETAILED DESCRIPTION OF THE DRAWING

As illustrated in the FIGURE, the device for heating and cooling consists of an equipment block 1 and of a heating or cooling unit 2 which can be slid into the equipment block 1. In the embodiment, the heating or cooling unit 2 is constructed as a heat exchanger 2. However, the heating or cooling unit can also consist of an evaporator, a condenser, a cooler or the like, any of which can be referred to as a heating or cooling component.

Ventilation openings 3 are located on the equipment block 1 and are conventionally used for ventilating a vehicle interior. The ventilation openings 3 lead to the windshield, to the center plane and to the leg space of the motor vehicle and can be closed in a conventional manner by means of mode flaps which are not shown.

The equipment block 1 has a mounting opening 4 for the heat exchanger 2. Through this mounting opening 4, the heat exchanger 2 can be slid into the equipment block 1. The heat exchanger 2, after being slid into the equipment block 1, is fixed therein by being clamped into an insulating foam material (not shown). For this purpose, the conventionally constructed heat exchanger 2, which has an upper collecting body 5 and a lower collecting body 6, is enclosed with a special foam material on the collecting bodies 5, 6 before being slid-in. The special foam material may, for example, have the characteristic that it expands when heat is supplied and thus fixes the heat exchanger 2 in the opening 4.

The upper collecting body 5 and the lower collecting body 6 are connected with one another by heat exchange lamellae 7. After the heat exchanger 2 has been slid into the equipment block 1, the fresh air or circulating air delivered by the fan (not shown in detail) flows through the heat exchange lamellae 7. An inlet pipe 8 is situated on the upper collecting body 5, and an outlet pipe 9 is situated on the lower collecting body 6. As illustrated in the FIGURE, the inlet pipe 8 and the outlet pipe 9 each have a bend 10.

Clamping elements constructed as fastening clips 11 are situated on the equipment block 1. The fastening clips 11 are cast onto the equipment block 1. The manufacturing of the equipment block 1 and of the fastening clips 11 can take place in one working step. The fastening clips 11 are provided with two receiving openings 12, one receiving opening 12 being provided for the inlet pipe 8 and the other receiving opening 12 being provided for the outlet pipe 9 of a heating or cooling unit. After the heat exchanger 2 has been introduced into the equipment block 1, the inlet pipe 8 and the outlet pipe 9 are snapped into the respective receiving opening 12. By means of the simple connecting of the inlet pipe 8 and of the outlet pipe 9 by the fastening clips 11, it is ensured that no tool is required for the mounting or the demounting operation.

The two fastening clips 11 are mounted to the equipment block 1 in such a manner that they are situated to be offset with respect to one another by at least approximately 90°. By means of this displacement of the fastening clips 11 in conjunction with the bend 10 in the inlet and outlet pipes, it is ensured that the inlet pipe 8 and the outlet pipe 9 are firmly fixed in the horizontal and in the vertical direction and are not displaced when stressed. In order to ensure a particularly advantageous and stable fastening of the inlet pipe 8 and of the outlet pipe 9, one fastening clip 11 is arranged between the heat exchanger 2 and the bend 10, and another fastening clip 11 is arranged behind (or downstream of) the bend 10. As illustrated in the FIGURE, at least two fastening clips 11 are provided for each pipe part.

In order to use the device according to the invention for cooling the interior of a motor vehicle, an evaporator, which is not shown in detail, is built into the equipment block 1 in a similar manner in addition to the heat exchanger 2. Analogously to the heat exchanger 2, corresponding inlet and outlet pipes are situated on this evaporator and, as illustrated for the heat exchanger 2, are connected with the equipment block 1. In this case, a correspondingly larger number of fastening clips 11 is situated on the equipment block 1. The device according to the invention can naturally also be used analogously for a condenser or a cooler at other installation sites in the vehicle.

The equipment block, which contains the heat exchanger and the evaporator, is situated in the center console of the vehicle or its vicinity. The cooler and the condenser are situated outside the cabin. Outside air flows directly through the cooler and the condenser.

Depending on the media flowing through them, the inlet pipes 8 and the outlet pipes 9 consist either of hoses or of tubes. Naturally, various other add-on pieces, such as water valves, which are not shown here in detail, can also be snapped onto the equipment block 1 by means of the fastening clips 11. The equipment block 1 generally consists of a plastic material. This is because plastic can be processed in a particularly advantageous manner and, in addition, does not stress the vehicle by means of an unnecessarily high weight.

The equipment block 1 is generally situated in the dashboard of a motor vehicle and is connected by means of corresponding connection elements with the various air ducts and the heater operating unit of the motor vehicle.

In order to be able to mount the heat exchanger 2 in the equipment block 1, it must only be slid into the equipment block 1. After the sliding-in of the heat exchanger 2, the inlet pipe 8 and the outlet pipe 9 are inserted in the fastening clips 11. A faulty sliding-in of the heat exchanger 2 is not possible because of the clear positioning of the fastening clips and because of the fixing of the heat exchanger 2 in the equipment block 1. The inlet pipe 8 and the outlet pipe 9 may be released from the fastening clips 11 be a defined use of force. As a result, the heat exchanger 2 can be removed without any problem from the equipment block 1 for servicing and repair purposes. The clamping-in of the heat exchanger—pipe unit ensures freedom from rattling during vehicle vibrations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heating or cooling arrangement in a motor vehicle, comprising:
    an equipment block having clamping elements and an exterior opening;
    at least one heating or cooling component having arranged thereon an inlet and outlet pipe as a preassembled component;
    wherein the heating or cooling component is inserted into the exterior opening of the equipment block with an orientation such that the inlet and outlet pipes extend out of the opening and are connected with the equipment block via the clamping elements.

2. The heating or cooling arrangement according to claim 1, wherein the at least one heating or cooling component is one of a heat exchanger, an evaporator, a condenser and a cooler.

3. The arrangement according to claim 1, wherein the clamping elements are constructed as fastening clips.

4. A heating or cooling arrangement in a motor vehicle, comprising:
    an equipment block having clamping elements;
    at least one heating or cooling component having arranged thereon an inlet and outlet pipe as a preassembled component;
    wherein the heating or cooling component is inserted into the equipment block such that the inlet and outlet pipes are connected with the equipment block via the clamping elements;
    wherein the clamping elements are constructed as fastening clips; and
    wherein at least two fastening clips are provided, said two fastening clips being arranged offset with respect to one another by at least approximately 90°, and are provided for the inlet and outlet pipes.

5. A heating or cooling arrangement in a motor vehicle, comprising:

an equipment block having clamping elements;

at least one heating or cooling component having arranged thereon an inlet and outlet pipe as a preassembled component;

wherein the heating or cooling component is inserted into the equipment block such that the inlet and outlet pipes are connected with the equipment block via the clamping elements;

wherein the clamping elements are constructed as fastening clips; and wherein the equipment block is formed of a plastic material, said fastening clips being produced in one-piece with the equipment block.

6. The arrangement according to claim 4, wherein the equipment block is formed of a plastic material, said fastening clips being produced in one-piece with the equipment block.

7. A heating or cooling arrangement in a motor vehicle, comprising:

an equipment block having clamping elements;

at least one heating or cooling component having arranged thereon an inlet and outlet pipe as a preassembled component;

wherein the heating or cooling component is inserted into the equipment block such that the inlet and outlet pipes are connected with the equipment block via the clamping elements;

wherein the clamping elements are constructed as fastening clips; and wherein the fastening clips have two receiving openings, one of said two receiving openings being respectively provided for the inlet and outlet pipe of the component.

8. The arrangement according to claim 4, wherein the fastening clips have two receiving openings, one of said two receiving openings being respectively provided for the inlet and outlet pipe of the component.

9. The arrangement according to claim 5, wherein the fastening clips have two receiving openings, one of said two receiving openings being respectively provided for the inlet and outlet pipe of the component.

10. The arrangement according to claim 1, wherein each of the inlet and outlet pipes is provided with a bend.

11. The arrangement according to claim 2, wherein each of the inlet and outlet pipes is provided with a bend.

12. The arrangement according to claim 3, wherein each of the inlet and outlet pipes is provided with a bend.

13. The arrangement according to claim 4, wherein each of the inlet and outlet pipes is provided with a bend.

14. The arrangement according to claim 5, wherein each of the inlet and outlet pipes is provided with a bend.

15. The arrangement according to claim 7, wherein each of the inlet and outlet pipes is provided with a bend.

16. A method of manufacturing a heating or cooling arrangement in a motor vehicle, the method comprising the acts of:

forming at least one of each of an inlet and outlet pipe on a heating or cooling component to provide a preassembled component;

sliding the preassembled component into an equipment block on which are arranged clamping elements at defined locations; and connecting the inlet and outlet pipes of the preassembled component with the clamping elements on the equipment block.

17. The method according to claim 16, further comprising the act of initially forming the equipment block and clamping elements in one-piece of a plastic material.

18. The method according to claim 16, further comprising the act of initially forming the inlet and outlet pipes with a defined bend in order to precisely align with the defined locations of the clamping elements on the equipment block.

* * * * *